United States Patent [19]

Iyengar et al.

[11] Patent Number: 5,724,547
[45] Date of Patent: *Mar. 3, 1998

[54] LRU POINTER UPDATING IN A CONTROLLER FOR TWO-WAY SET ASSOCIATIVE CACHE

[75] Inventors: Sundaravarathan Rajagopalan Iyengar; James Nadir, both of Santa Clara, Calif.

[73] Assignee: Intel Corporation, Santa Clara, Calif.

[*] Notice: The term of this patent shall not extend beyond the expiration date of Pat. No. 5,530,833.

[21] Appl. No.: 671,446

[22] Filed: Jun. 27, 1996

Related U.S. Application Data

[63] Continuation of Ser. No. 486,132, Jun. 6, 1995, Pat. No. 5,530,833, which is a continuation of Ser. No. 245,805, May 17, 1994, abandoned, which is a continuation of Ser. No. 691,240, Apr. 25, 1991, abandoned.

[51] Int. Cl.$^6$ ...................................................... G06F 12/12
[52] U.S. Cl. ................................ 395/455; 395/463; 395/487
[58] Field of Search ...................................... 395/455, 456, 395/460, 462, 463, 471, 472, 473, 483, 486, 487; 365/49, 230.03, 230.04

[56] References Cited

U.S. PATENT DOCUMENTS

| | | | |
|---|---|---|---|
| 4,363,095 | 12/1982 | Woods et al. | 395/416 |
| 5,210,845 | 5/1993 | Crawford et al. | 395/455 |
| 5,339,399 | 8/1994 | Lee et al. | 395/473 |
| 5,530,833 | 6/1996 | Iyengar et al. | 395/455 |

*Primary Examiner*—Glenn Gossage
*Attorney, Agent, or Firm*—Blakely, Sokoloff, Taylor & Zafman

[57] ABSTRACT

A cache controller tag random access memory (RAM) is configured into two ways, each way including tag and valid-bit storage for associatively searching a directory for cache data-array addresses. The two ways, a right way and a left way, each store tag addresses. There are two lines selected during a line fill to one of the ways. A least recently used (LRU) pointer selects which way to fill on a line fill cycle. The right way is selected for a line fill in response to right hit signal provided that the LRU pointer points to the right way. The LRU pointer is flipped to point to the left way upon the filling of the right line of the right way. The left way is selected for a line fill in response to a left hit signal provided that the LRU pointer points to the left way. The LRU pointer is flipped to point to the right way upon the filling of the left line of the left way.

20 Claims, 3 Drawing Sheets

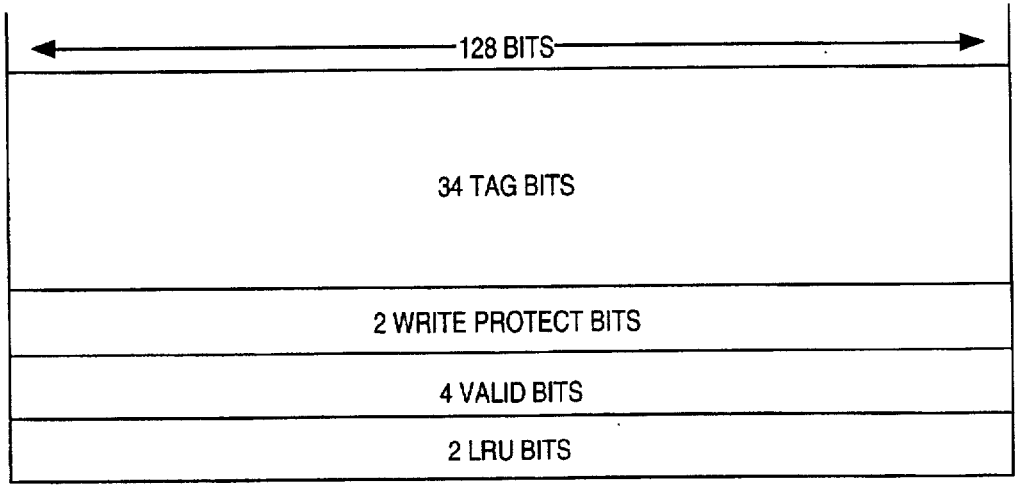

FIG. 2

| LINE SELECT (LS) | HIT LEFT (zADSHL) | HIT RIGHT (zADSHR) | LRU POINTER (zADSLRU) | WAY SELECT (zWAYSEL) | VL 0 | VL 1 | VR 0 | VR 1 |
|---|---|---|---|---|---|---|---|---|
| 0<br>1 | 1<br>1 | 0<br>0 | X<br>X | LEFT<br>LEFT | NEW<br>VL0 | VL1<br>NEW | | |
| 0<br>1 | 0<br>0 | 1<br>1 | X<br>X | RIGHT<br>RIGHT | | | NEW<br>VR0 | VR1<br>NEW |
| 0<br>1 | 1<br>1 | 1<br>1 | X<br>X | RIGHT<br>RIGHT | | | NEW<br>VR0 | NEW<br>VR0 |
| 0<br>1 | 0<br>0 | 0<br>0 | 0<br>0 | LEFT<br>LEFT | NEW<br>0 | 0<br>NEW | NEW<br>0 | 0<br>NEW |
| 0<br>1 | 0<br>0 | 0<br>0 | 1<br>1 | RIGHT<br>RIGHT | NEW<br>0 | 0<br>NEW | NEW<br>0 | 0<br>NEW |

FIG. 3

# LRU POINTER UPDATING IN A CONTROLLER FOR TWO-WAY SET ASSOCIATIVE CACHE

This is a continuation of application Ser. No. 08/486,132, filed Jun. 6, 1995, now U.S. Pat. No. 5,530,833, which is a continuation of application Ser. No. 08/245,805, filed May 17, 1994, now abandoned, which is a continuation of application Ser. No. 07/691,240, filed Apr. 25, 1991, also now abandoned.

CROSS-REFERENCE TO RELATED APPLICATIONS/PATENTS

U.S. Pat. No. 5,210,845 of John H. Crawford, et al., granted on May 11, 1993, entitled "Controller for Two-Way Set Associative Cache", and U.S. Pat. No. 5,339,399, of Yong Lee, et al., granted on Aug. 16, 1994, entitled "Cache Controller that Alternately Selects for Presentation to a Tag Ram a Current Address Latch which holds Addresses Captured on an Input Bus", (both of which are assigned to Intel Corporation of Santa Clara, Calif., the assignee of the present invention) are incorporated herein by reference.

1. Technical Field

The present invention relates to data processing systems and more particularly, to a method and means for updating a least recently used (LRU) data pointer in a controller for a data cache.

2. Background Art

A cache is a relatively high-speed, small, local memory which is used to provide a local storage (a buffer store) for frequently accessed memory locations of a larger, relatively slow, main memory (a backing store). By storing the information or a copy of the information locally, the cache is able to intercept memory references and handle them directly without transferring the request to the main memory over the system bus. The result is lower traffic on the memory bus and decreased latency on the CPU bus to the requesting processor.

The above-referenced U.S. Pat. No. 5,210,845 discloses a cache controller which has a tag RAM which is configured into two ways, each way including tag and valid-bit storage for associatively searching the directory for cache data-array addresses. The external cache memory is organized such that both ways are simultaneously available to a number of available memory modules in the system to thereby allow access to the ways to occur in parallel with the tag lookup.

The above-referenced U.S. Pat. No. 5,339,399 discloses a method and means for managing complex timing cycles in the controller of U.S. Pat. No. 5,210,845.

In a buffer/backing store memory hierarchy, requested data may not currently reside in the higher-speed buffer store and so access has to be made to the backing store to retrieve the data. Since it is necessary to make space for the new data in the buffer, data at some location in the buffer must be displaced by the new data. The new data then replaces data at a chosen location in the buffer store and the data occupying the location is displaced, the assumption being that the just fetched data will probably be needed again. Choosing what location to displace is done by making the assumption that the data most recently used (MRU), i.e. most recently added to the buffer, should be retained since it will probably be needed again. In contradistinction, the data location least recently used (LRU) probably is no longer needed and can be safely removed from the buffer and if needed again a duplicate back-up copy can be fetched from the backing store. A pointer, called an LRU pointer, is maintained that always points to the next location chosen by the logic to be replaced. How that LRU pointer is chosen will greatly affect the efficiency of the system by increasing or decreasing the number of accesses that must be made to the backing store over a given period of time. In conventional buffer/backing store systems, a least recently used (LRU) pointer points to the data in the buffer that is the least recently used and this is the data that is replaced by new data from the backing store. In the controller described in U.S. Pat. No. 5,210,845 there are two sectors for each way, which means that there are two lines of data at a given set address, but only one line will be filled at any one time. Therefore, one line could have valid data while the other line may not have valid data. Since valid data can be placed in only one line at a time, when the data is put in a line, then that line contains the most recently used data and a conventional LRU algorithm would always designate that the LRU pointer should not be pointing to it. But this would not make efficient use of space in the two sector arrangement described above.

It is therefore an object of the present invention to provide a method and means for updating a LRU pointer in a controller for a data cache in which there are two sectors per way.

SUMMARY OF THE INVENTION

Briefly, the above objects are accomplished in accordance with the invention by providing a cache controller tag random access memory (RAM) that is configured into two ways, each way including tag and valid-bit storage for associatively searching a directory for cache data-array addresses. The two ways, a right way and a left way, each store tag addresses. There are two lines selected during a line fill to one of the ways. A LRU pointer is combined with left hit and right hit signals to generate a way select signal (zWAYSEL) that selects which way to fill on a line fill cycle. The right way is selected for a line fill in response to a right hit signal provided that the LRU pointer points to the right way. The LRU pointer is flipped to point to the left way upon the filling of the right line of the right way. The left way is selected for a line fill in response to a left hit signal provided that the LRU pointer points to the left way. The LRU pointer is flipped to point to the right way upon the filling of the left line of the left way. In accordance with an aspect of the invention, the LRU pointer is only updated on a read miss cycle and a write hit cycle, and is left unchanged on a read hit cycle.

The invention has the advantage that by not updating the LRU pointer on a read hit, the algorithm favors a buffer/backing store system in which traffic on the bus is predominantly write cycles.

BRIEF DESCRIPTION OF THE DRAWINGS

The invention will be apparent from the following, more particular description of the preferred embodiment of the invention as illustrated in the accompanying drawings, wherein:

FIG. 2 is a diagram of the bit fields within each tag RAM of FIG. 1;

FIG. 3 is a table illustrating tag selection for line fills; and,

DESCRIPTION OF THE PREFERRED EMBODIMENT

Figure 1:
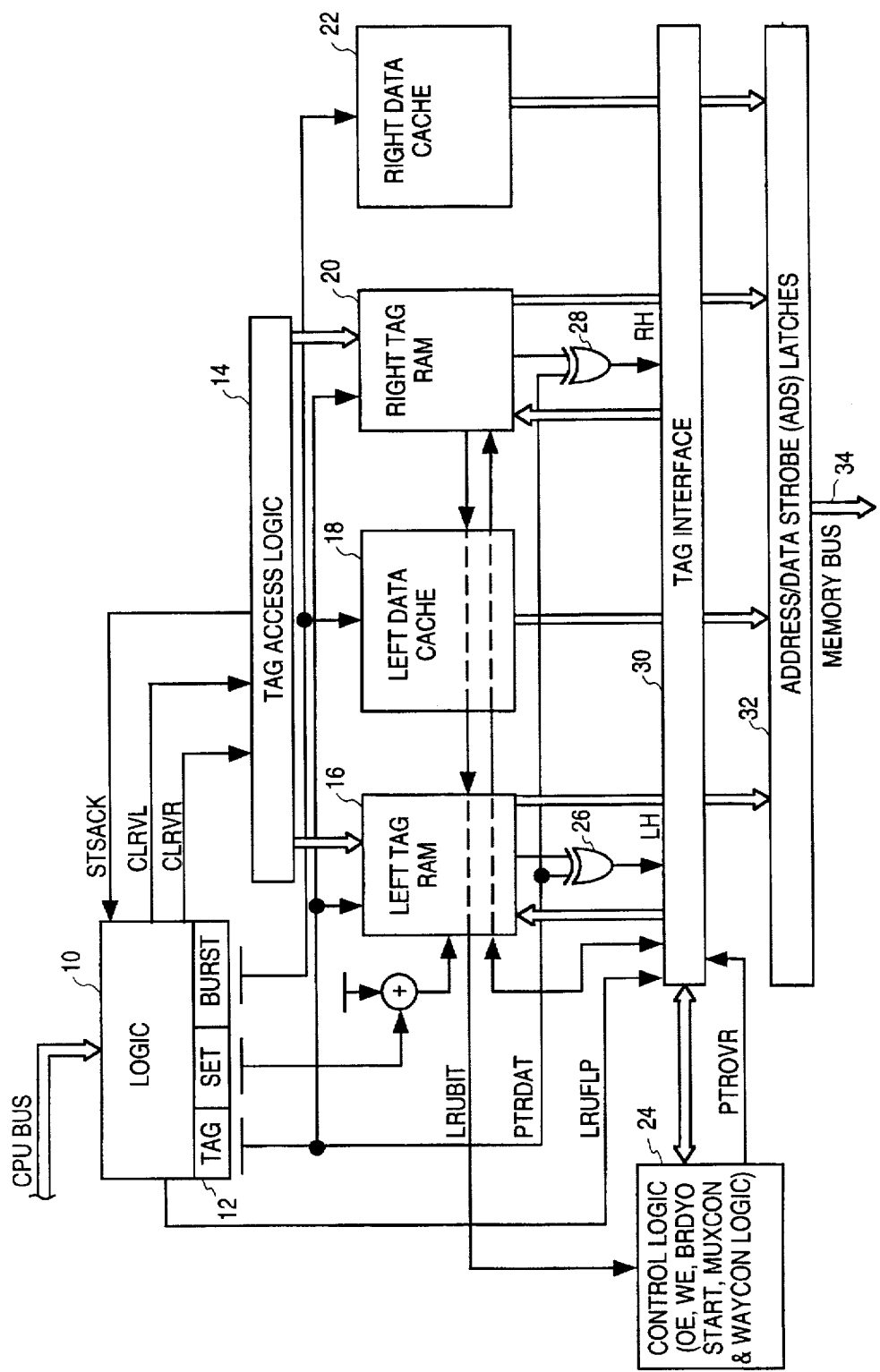
FIG. 1 is a block diagram of a two way, set associative cache in which the invention is embodied.
Figure 4:
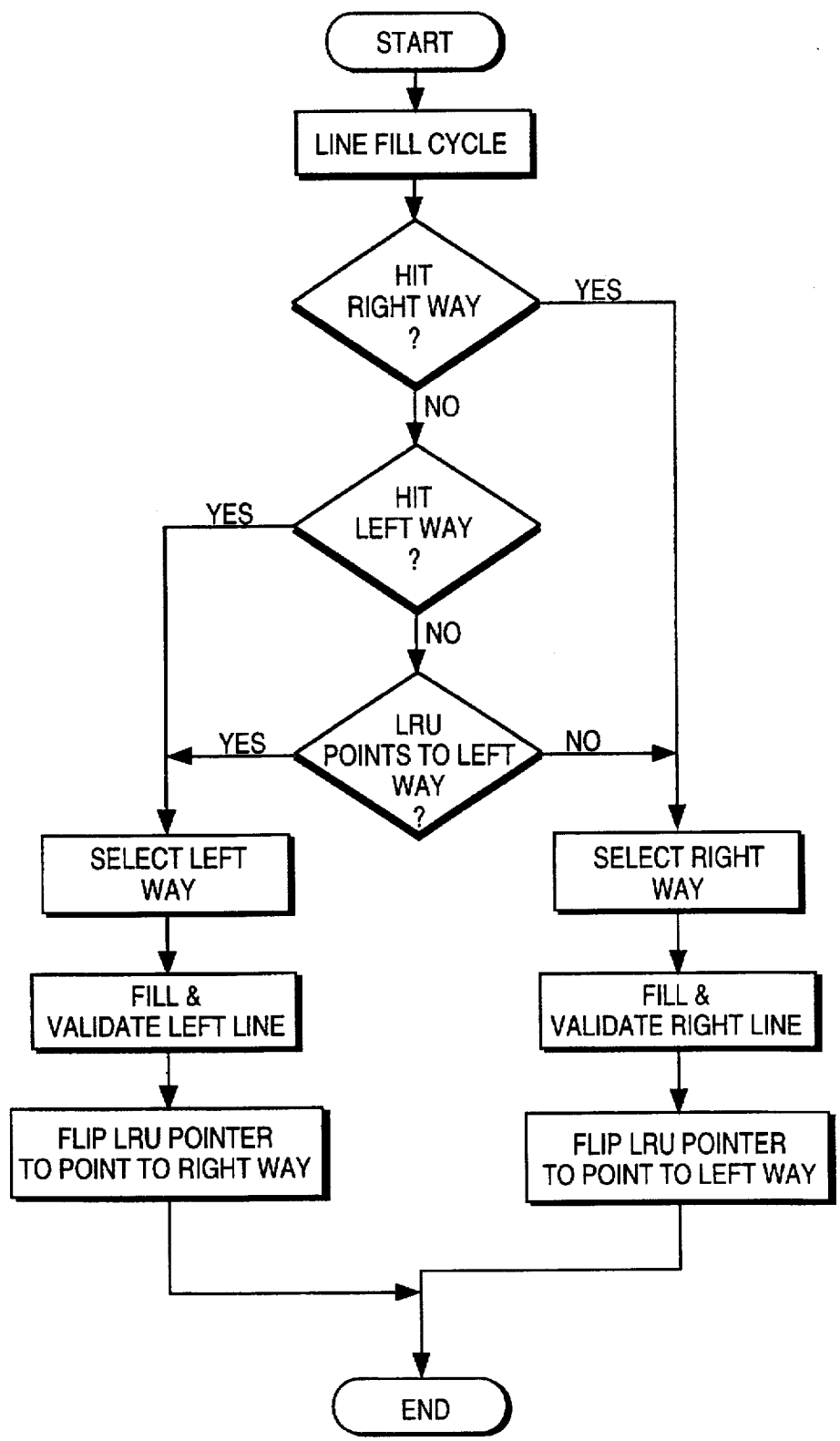
FIG. 4 is a flow chart of the LRU pointer update procedure.

Refer now to FIG. 1 which is a block diagram of the two way, set associative cache described in U.S. Pat. No. 5,210, 845. A RLS logic (10) drives tag access logic (14). The term "RLS" is an acronym for Register-transfer-level-to Layout Synthesis, which is a design tool for generating timings and controls for logic designs. Tag access logic (14) drives an associative memory left tag RAM (16) and left data cache (18), which together make up way 0 and right tag RAM (20) and right data cache (22), which together make up way 1.

As shown in FIG. 2, each tag RAM or way has 34 tag bits, 2 write protect bits, and 4 valid bits. In addition, the left tag RAM has 2 LRU bits which comprise an LRU pointer.

Left hit logic (26) and right hit logic (28) are compare circuits which provide an output to the tag interface control logic (30) when there is a match between the tag search argument (12) and a tag address in the associative memory.

The tag interface (30) drives address/data strobe (ADS) latches (32) that latch information to be placed on the memory address/data bus (34). Control logic (24) is connected to each of the logic blocks to provide the necessary control signals such as write enable (WE), output enable (OE), BRDYO, start, MUXCON and WAYCON to the logic blocks described above.

Throughout this description the following notation will be used for signal names. Each internal signal name begins with a characteristic letter that identifies its generic source. The first character can be one of {r, t, x, y, z}. The remaining part of the signal name is in upper case letters.

A signal ending in "nn" means it is a low-true signal. The corresponding notation for an external signal will have "#" instead.

Also, brackets '{ }' are used to describe signal names containing the substrings within the brackets. For example, rWR{STS, TAG, LRU} stands for rWRSTS, rWRTAG, and rWRLRU, respectively. When the substrings are one character in length, then a pair of brackets are used without separating the characters with a comma. For example, [yz] ADSnn means yADSnn and zADSnn. Brackets are also used to denote ranges. For example, zSAl{0–10} stands for zSAl0, zSAl1, . . . . zSAl10. When such multiple-bit signals are referred to, the range-specifier is deleted. For instance, the eleven zSAl[0–10] signals are denoted as zSAl.

Traditionally, an LRU pointer points to the data that is the least recently used and this is the data that is to be replaced. In the controller described in U.S. Pat. No. 5,210,845 there are two sectors for each way, which means there are two lines of data. One line could have valid data and the other line may not have valid data. Valid data can be placed in only one line at a time. When the data is put in the line, then it is the most recently used data and therefore the LRU pointer should not be pointing to it. So the zPTRDAT line flips the LRU to point in the opposite direction. For any access to the tag RAM, the signal zWAYSEL decides if it is to be on the left or right side. During normal cycles, zWAYSEL has a meaning only in a line fill where a line has to be selected for filling. The tag hit signals are used in conjunction with the LRU pointer to decide the value for the signal zWAYSEL in accordance with the information shown in FIG. 3.

The LRU pointer is updated on a read miss, a write hit, and on a snoop hit. On a snoop cycle, if a hit occurs on the left way, then the LRU pointer is forced to point to the left way. If the hit occurs on the right way, then the LRU pointer is forced to point to the right way. On a line fill just the opposite is done. If a line fill is to the left side, then the LRU pointer is forced to point to the right side. This is because by definition if the hit puts new data in, then the least recently used data is on the opposite side.

The LRU pointer has to be flipped to the other way when the current line is to be validated. This is automatically done in the TAGIFC (30). However, if the line is to be invalidated, then the LRU pointer has to be flipped back to point to the old way. The signal rLRUFLP provides the data for flipping the LRU bit. If the signal rLRUFLP is zero, then the LRU pointer is changed to point to the same way as zPTRDAT during a tag update. If the signal rLRUFLP is a one, then the LRU pointer is set to its original value during the tag update.

The signals WRLRU, rWRSTS, rWRTAG from the RLS logic (10) to the tag access (14) are the tag-write commands which decide when to update the tag RAM. A line fill operation and the timings therefore are described in U.S. Pat. No. 5,339,399.

The tag bits are written whenever the status bits are written. An acknowledgment for a write command comes from the tag access logic (14) which, when the tag RAM is ready to honor the write command from RLS logic (10), generates the signal zSTSACK. The write-commands persist as long as the acknowledgment is not seen. zSTSACK is generated at an occurrence of the signal SACLK if a write request from the RLS logic can be used by the tag access logic (14) to generate a tag access. zSTSACK will not be generated if the tag RAM is busy, at the occurrence of the signal SACLK, with a snoop access.

Cache Directory

The function of the cache directory, which comprises left tag RAM (16) and right tag RAM (20), is to store addresses (or tags) which correspond to data which is stored in the left data cache (18) and right data cache (22). The directory is configured into two ways (WAY0, WAY1). A line is a basic unit of data transferred between the cache and the main memory. It consists of 16 bytes of data. A line is also known as a transfer block. If the data corresponding to a particular address is stored in the cache, the cache can supply the data, thus avoiding a main memory access. This is referred to as a cache hit, either from the left way (LH) or the right way (RH). The decision, hit or miss, is determined on a per line basis. An address block is the basic unit of cache addressing. Each address block describes the physical address of one of two contiguous lines of data.

There is a valid bit associated with each line within an address block. If the line is present in the cache, then the valid bit is turned on. The address information held in the left tag RAM (16) and right tag RAM (20) is referred to as a tag. Since many addresses map to a single address block, the tag information is used to identify the exact memory locations that are currently associated with an address block. A hit occurs when the tag of an address block in the associative memory matches the bus address as presented to the associative memory as a search argument (12) and the desired line valid bit is on.

Each tag RAM (16, 20) provides storage for the tag and valid bits. Multiple simultaneous comparisons are made in the compare circuits between the bus address (12) and tag fields in the ways to determine if the data is in the cache data array. A set is a grouping of address blocks consisting of one address block from each way. All of the address blocks in a set are simultaneously selected when the set portion of the CPU bus address is decoded into a set address (12) by a decoder in the RLS logic (10).

When a write transaction on the central processing unit (CPU) bus involves an address which is not in the cache (a cache miss), no attempt is made to store the corresponding data in the cache. However, when a write transaction on the CPU bus involves an address which is in the cache (a cache hit), the directory uses a write-through policy. This means that CPU bus-writes that result in a cache hit are written into the cache as well as main memory. This ensures that main memory always holds a valid copy of all data locations of the cache.

Functional Description

There are five types of cycles that occur, four normal cycles and a snoop cycle:

Read Miss (line fill)
Read Hit
Write Miss
Write Hit
Snoop
Read Miss (line fill)

A read miss cycle starts with zADSCYC and zRDSCYC. The tag look-up will yield a miss at the first SHCLK. (The relationships between clock timings signals are described in more detail in U.S. Pat. No. 5,339,399.) START# goes active indicating a miss. From then on, the logic will wait until SKEN# is active. If SKEN# is active before the first transfer, then the line is said to be committed. A line in the tag RAM is selected (zWAYSEL) using the zADSLRU, zADSHL and zADSHR signals as shown in FIG. 3. Tag write commands are issued to invalidate the line. Also the corresponding first write-enable is issued.

An active SKEN# will result in a request to the tag RAM to validate the line, if the line is not already valid. An inactive SKEN# will result in a request to invalidate the line if the line is not already invalid. The write-protect pin (WP) is written at each such request. The LRU bit is made to point to the other way, if the line will be left in a valid state. If the line is valid, and the cycle is aborted with a BOFF#, then a request will be made to tag RAM to invalidate the line.

Read Hit

A read hit cycle starts with zADSCYC and zRDSCYC. The tag look-up will yield a hit at the first SHCLK. BRDYO# will go active indicating a hit. Also the first output-enable (OE1) goes active. The first output-enable is selected from the four possibilities using the burst address sequence described in U.S. Pat. No. 5,339,399. Since the cache controller is signaling the transfers at every clock with BRDYO#, the logic will advance through successive states at every clock. The appropriate enable is created for each transfer. If a transfer is interrupted, then a request is made to the tag RAM to invalidate the line. The LRU bit is not updated on a read hit.

Write Miss

A direct-processor write cycle starts with and zADSCYC and zWRSCYC followed by START#. If a write miss occurs at the time START# is asserted, then no enable is asserted. On a write miss, nothing is done to the LRU pointer bit and only START# will remain active.

Write Hit

As above, a direct-processor write cycle starts with zADSCYC and zWRSCYC followed by START#. If a write hit occurs at the time START# is asserted, then the appropriate write enable is asserted. The LRU pointer is set so that it points to an opposite way on this write hit.

Snoop

In a multiprocessor environment there may be more than one processor sharing the same memory space. Suppose the data is stored in the cache of one processor and the other processor goes to external memory for the same data. If the second processor changes the data, then the data in the first processor's cache would be corrupted. A snoop signal is sent to every processor and monitored by each processor. If any processor has a private copy of the data at the address of the line indicated by the snoop signal, then it must go into its cache and invalidate that line. There is an address on the bus associated with the snoop signal. Therefore, if there is an address on the bus and the snoop signal is raised, then the processor must go in and invalidate the local private copy of the data. The snoop cycles are independently handled and they can be overlaid with the other cycles, termed the normal cycles.

A snoop hit will automatically force the LRU bit to point to the selected way. The way is selected with zWAYSEL.

The tag interface logic (30) captures the output of tag RAM at the first SHCLK after the first ADS# that begins a cycle. The captured outputs are kept in the ADS latches (32) until the cycle ends. On a line fill, the valid information for the current line is generated as function of SKEN#. The valid information for the other line within the set is obtained from the ADS latches (32). Then the information for both the lines is written into the tag RAM. The rCLRV[LR] signals (rCLRVL and rCLRVR) from the RLS logic (10) are used to clear this "other" line information, when that line has been invalidated during the cycle, either through an explicit snoop or using flush.

In FIG. 1, the signal lines LH, RH and valid bits indicate to the control logic (24) and to the tag interface (30) that a hit or miss occurred during the current access. For a hit, both the tag bits (tH1 or tHR) and the corresponding valid bits (tVL[01] or tVR[01]) have to hit simultaneously. tLWP and tRWP are the write-protect bits from the left and right sides, respectively. The control logic (24) uses these signals to decide if it is a hit cycle or a miss cycle. MUXCON uses them during snoop cycles to decide if the snoop was a hit. For a normal cycle, TAGIFC (30) captures these signals in the ADS latches (32) to produce zADS (HL, HR, VL0, VL1, VR0, VR1) and zRLS[LR]WP signals. During a snoop, these signals are captured in the snoop latches. The outputs from the snoop latches remain local to TAGIFC (30).

The zADSLRU signal from the tag interface (30) to the RLS logic (10) and the control logic (24) is the tLRU signal captured at the first SHCLK after zADSCYC. The value is held until the cycle ends. The latch is clocked by SHCLK and enabled by zADSCYC and zADSCS. In the RLS logic (10), zADSLRU is clocked by PCLK and then is used to create rLRUFLP. In the control logic (24), the signal zADSLRU is used to generate zWESEL, zWAYSEL and zIWAYSEL.

The zADSV[LR][01], zADSH[LR] signals from the tag interface (30) to the RLS logic (10), control logic (24) and tag access logic (14) are tV[LR][01] and tH[lr] signals, respectively, captured at the first SHCLK after zADSCYC. The latches are enabled by zADSCS and zADSCYC. The RLS logic (10) uses them to create local hit/miss information. The control logic (24) uses zADSHR to create zWESEL, zWAYSEL, and zIWAYSEL. In tag access logic (14), these signals generate zWRLRU during a direct-processor write-hit cycle.

The zPTRDAT signal from the tag interface (30) to the left tag RAM (16) and right tag RAM (20) is the LRU bit to be written into the tag RAM. On all tag RAM updates during normal cycles zPTRDAT is the inverse of zADSLRU. If, however, rLRUFLR is active, then zPTRDAT takes the same value as zADSLRU. During snoop hits, zPTRDAT is set to the way opposite to where the snoop invalidation is done.

The zPRTOVR signal from the control logic (24) to the tag interface (30) logic allows overriding of the LRU pointer during snoops. When active, zPTROVR forces the LRU pointer to point to the way opposite to where the snoop invalidation is taking place. zPTROVR is zSNPWAIT captured by a SACLK latch.

The zSNPHR signal from the tag interface (30) logic to the WAYCON logic is a tag hit signal from the right side of tag RAM captured at the first SHCLK after zSNPCYC. In conjunction with zSNPWAIT, it selects the way for snoop invalidation.

The zVL0, zVL1, zVR0 and zVR1 signals from the TAGIFC (30) logic to the left tag RAM (16) and right tag RAM (20) are status bits written into the tag RAM at every write request. The write-protect bit is altered by zWPO. The LRU pointer bit values are altered by zPTRDAT. At any time only one line can be updated in any one way. The tag RAM uses zWAYSEL to decide which two of the four incoming valid signals should be used for an update. However, the control logic (24) is responsible for correctly generating the status information for two signals selected by zWAYSEL. For the current line, the valid bit can be computed (rV).

The valid information for the other line is obtained from the ADS latches (zADSV[LR][01]). If the other line is snooped out, then the appropriate ADS latches (32) would have been reset by the rCLRV[LR] signals.

The zWAYSEL signal from the control logic (24) to the TAGIFC (30) and TAGRAM selects the way. For any access to the tag RAM, zWAYSEL decides if it is to be on the left or right side. During normal cycles, zWAYSEL has a meaning only in a line fill where a line has to be selected for filling. The tag-hit signals are used in conjunction with the LRU bit to decide the value for zWAYSEL as shown in FIG. 3.

On a snoop, if there is a hit (zADSHL or zADSHR will be one), then zWAYSEL gets set accordingly for the duration of snoop. It will be returned to the value set by the cycle if a cycle was running when the snoop hit. In the TAGIFC, zWAYSEL decides whether the status bits for a particular way should be recomputed or recirculated. In left tag RAM (16) and right tag RAM (20), zWAYSEL is used to select a way for updates.

The zWESEL signal from the control logic (24) to the RLS logic (10) and the write enable (WE) logic is identical to zWAYSEL, except that the snoops will not determine the selection of a way once the way selection is determined at the beginning of a cycle by the hit/miss information. Only the tag RAM needs to know which way is being snooped out. For WE and RLS logic (10), the way information should remain constant throughout the cycle.

The zWRSTS, zWRLRU and zWRTAG signals from the tag access (14) and TAGRAM logic are write commands. The status bits (valid and write-protect), LRU pointer bit and the tag bits are written at the selected set address when the corresponding write-command is active. The commands are overridden by zFLUSHnn.

While the invention has been particularly shown and described with reference to preferred embodiments thereof, it will be understood by those skilled in the art that the foregoing and other changes in form and detail may be made therein without departing from the scope of the invention.

What is claimed is:

1. A method of selecting a way within a cache directory for storing a received tag address, the received tag address being associated with data to be stored in a cache, associated with the cache directory, the cache directory comprising first and second ways each configured to store a tag address, the method comprising the steps of:

automatically maintaining a pointer for identifying either the first or the second way as storing a tag address associated with data stored within the cache that has been least recently used; and selecting the first way for storage of the received tag address if the first way is identified by the pointer.

2. The method of claim 1 wherein the step of maintaining the pointer comprises identifying the first way with the pointer when the second way receives a tag address hit during a memory read or write cycle.

3. The method of claim 1 wherein the step of maintaining the pointer comprises identifying the first way with the pointer when a tag address is received within the second way.

4. The method of claim 1 wherein the step of maintaining the pointer comprises maintaining the pointer in a current state if a tag address miss of both the first and second ways occurs.

5. The method of claim 1 wherein the first and second ways are each configured to store a plurality of tag addresses, each tag address of the first way being paired with a tag address of the second way, and wherein the method includes the step of maintaining a pointer for each tag address pairing for identifying either the tag address within the first or second way as being associated with data stored within the cache that has been least recently used.

6. The method of claim 1 wherein the step of maintaining the pointer comprises identifying the first way with the pointer when data, stored within the cache and associated with a tag address stored in the first way, is invalidated.

7. The method of claim 6 wherein the data, stored within the cache and associated with the tag address stored in the first way, is invalidated in a snoop cycle.

8. A method of claim 1, wherein the step of maintaining the pointer comprises the steps of:

detecting the occurrence of a validation action or an invalidation action relating to a first tag address stored in the first way;

configuring the pointer to identify the second way on the occurrence of the validation action; and configuring the pointer to identify the first way on the occurrence of the invalidation action.

9. The method of claim 8 wherein the validation action comprises a tag address hit on the first tag address stored in the first way during a memory read or write cycle.

10. The method of claim 8 wherein the validation action comprises storing the first tag address in the first way.

11. The method of claim 8 wherein the invalidation action comprises a tag address hit on the first tag stored in the first way during a snoop cycle.

12. The method of claim 8 including the step of maintaining the pointer in a current state on the non-occurrence of either a validation or an invalidation action relating to the first tag address stored in the first way.

13. Apparatus for selecting a way, within a cache directory, for storing a received tag address, the received tag address being associated with data to be stored in a cache associated with the cache directory and the cache directory comprising first and second ways each configured to store a tag address, the apparatus comprising:

means for automatically configuring a pointer for identifying either the first or the second way as storing a tag address associated with data stored within the cache that has been least recently used; and means for selecting the first way for storage of the received tag address if the first way is identified by the pointer.

14. The apparatus of claim 13 wherein the means for automatically configuring configures the pointer to identifying the first way when the second way receives a tag address hit during a memory read or write cycle.

15. The apparatus of claim 13 wherein means for automatically configuring configures the pointer to identify the first way when a tag address is received within the second way.

16. The apparatus of claim 13 wherein the means for automatically configuring configures the pointer to identify the first way when data, stored within the cache and associated with a tag address stored in the first way, is invalidated.

17. Apparatus for selecting a way, within a cache directory, for storing a received tag address, the received tag address being associated with data to be stored in a cache associated with a cache directory and the cache directory comprising first and second ways each configured to store a tag address, the apparatus comprising:

first logic that automatically sets a pointer to identify either the first or the second way as storing a tag address associated with data that is stored within the cache and that has been least recently used; and second logic that selects the first way for storage of the received tag address if the first way is identified by the pointer.

18. The apparatus of claim 17 wherein the first logic sets the pointer to identify the first way when the second way receives a tag address hit during a memory read or write cycle.

19. The apparatus of claim 17 wherein the first logic sets the pointer to identify the first way when a tag address is received within the second way.

20. The apparatus of claim 17 wherein the first logic configures the pointer to identify the first way when data, stored within the cache and associated with the tag address stored in the first way, is invalidated.

* * * * *